(12) United States Patent
Fontana et al.

(10) Patent No.: US 11,131,209 B2
(45) Date of Patent: Sep. 28, 2021

(54) GAS TURBINE

(71) Applicant: ROLLS-ROYCE DEUTSCHLAND LTD & CO KG, Blankenfelde-Mahlow (DE)

(72) Inventors: Luca Fontana, Berlin (DE); Mathias Hoefgen, Potsdam (DE); Hana Jahic, Berlin (DE); Christoph Herzog, Vetschau-Spreewald (DE); Patrick Felscher, Wildau (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 167 days.

(21) Appl. No.: 16/447,483

(22) Filed: Jun. 20, 2019

(65) Prior Publication Data

US 2020/0003068 A1  Jan. 2, 2020

(30) Foreign Application Priority Data

Jun. 27, 2018 (DE) ..................... 10 2018 115 406.2

(51) Int. Cl.
*F01D 25/16* (2006.01)
*F01D 15/12* (2006.01)
(Continued)

(52) U.S. Cl.
CPC ............. *F01D 15/12* (2013.01); *F01D 25/16* (2013.01); *F01D 25/18* (2013.01); *F01D 25/183* (2013.01);
(Continued)

(58) Field of Classification Search
CPC .......... F01D 15/12; F01D 25/16; F01D 25/18; F01D 25/183; F16H 1/28;
(Continued)

(56) References Cited

U.S. PATENT DOCUMENTS 7,694,505 B2 * 4/2010 Schilling ................... F02K 3/06
60/226.1
7,726,113 B2 * 6/2010 Orlando .................. F02C 3/107
60/39.162
(Continued)

FOREIGN PATENT DOCUMENTS

| DE | 102014114043 A1 | 3/2016 |
| EP | 3002434 A1 | 4/2016 |
| EP | 3144486 A1 | 3/2017 |

OTHER PUBLICATIONS

European Search Report dated Nov. 20, 2019 from counterpart European Patent Application No. 19179979.0.
(Continued)

*Primary Examiner* — Justin D Seabe
*Assistant Examiner* — Theodore C Ribadeneyra
(74) *Attorney, Agent, or Firm* — Shuttleworth & Ingersoll PLC; Timothy Klima

(57) ABSTRACT

A gas turbine engine, in particular an aircraft engine, including: a turbine connected via an input shaft device to a gearbox device having a sun gear, a planet carrier having a plurality of planet gears attached thereto, and a ring gear, the sun gear is connected to the input shaft device, the planet carrier or the ring gear is connected to a propulsive fan via an output shaft device of the gearbox device, with an inter-shaft bearing system being positioned radially between the input shaft device and the planet carrier of the gearbox device.

22 Claims, 13 Drawing Sheets

(51) Int. Cl.
  *F01D 25/18* (2006.01)
  *F16H 1/28* (2006.01)
(52) U.S. Cl.
  CPC .......... *F16H 1/28* (2013.01); *F05D 2220/323* (2013.01); *F05D 2240/54* (2013.01); *F05D 2240/55* (2013.01); *F05D 2260/40311* (2013.01); *F05D 2260/98* (2013.01)
(58) Field of Classification Search
  CPC .......... F05D 2220/323; F05D 2240/54; F05D 2240/55; F05D 2260/40311; F05D 2260/98
  See application file for complete search history.

(56) References Cited

U.S. PATENT DOCUMENTS

| | | | |
|---|---|---|---|
| 8,869,504 B1 | 10/2014 | Schwarz et al. | |
| 10,119,548 B2 | 11/2018 | Venter | |
| 2008/0120839 A1* | 5/2008 | Schilling | F02C 7/36 |
| | | | 29/888.02 |
| 2008/0148707 A1* | 6/2008 | Schilling | F02C 7/36 |
| | | | 60/39.162 |
| 2014/0271135 A1 | 9/2014 | Sheridan et al. | |
| 2015/0176493 A1 | 6/2015 | Munsell et al. | |
| 2016/0010562 A1 | 1/2016 | Sheridan | |
| 2016/0146112 A1 | 5/2016 | Van der Merwe et al. | |
| 2017/0081973 A1 | 3/2017 | Swift et al. | |
| 2017/0159608 A1 | 6/2017 | Ertas et al. | |
| 2017/0175753 A1* | 6/2017 | Tan-Kim | F01D 21/045 |
| 2017/0276046 A1 | 9/2017 | McCune et al. | |
| 2018/0080388 A1 | 3/2018 | Boniface | |

OTHER PUBLICATIONS

European Search Report dated Nov. 6, 2019 for related European Patent Application No. 19182289.9.
German Search Report dated Apr. 2, 2019 from counterpart German App No. 102018115406.2.
German Search Report dated Apr. 2, 2019 from counterpart German App No. 102018115405.4.

* cited by examiner

GAS TURBINE

This application claims priority to German Patent Application DE102018115406.2 filed Jun. 27, 2018, the entirety of which is incorporated by reference herein.

The invention relates to a gas turbine with the features disclosed herein.

Gas turbine engines, in particular aircraft engines with geared turbofan engines require a suitable support for shaft arrangements driving the gearbox and/or the propulsive fan. One shafting arrangement of a geared turbofan engine is described in EP 3 144 486 A1.

This issue is addressed by a gas turbine with the features disclosed herein.

The gas turbine comprises a turbine connected via an input shaft device to a gearbox device having a sun gear, a planet carrier having a plurality of planet gears attached thereto, and a ring gear. Typically, the gearbox device is driven by a low pressure or intermediate pressure turbine of the gas turbine, i.e. the sun gear is connected to the input shaft device.

The gearbox device reduces the rotational speed from the turbine to the propulsive fan towards the front of the gas turbine engine making the overall engine more efficient. As will be described further below, the gearbox devices can have different designs.

Depending on the design of the gearbox device, the planet carrier or the ring gear is connected to the propulsive fan via an output shaft device of the gearbox device. The output shaft device can comprise several parts and is generally a hollow shaft with a cross-sectional shape adapted to the load case and the available space within the engine.

An inter-shaft bearing system is positioned radially between the input shaft device and the planet carrier of the gearbox device. A bearing system can be located on the input side and/or the output side of the gearbox device and can take axial loads which can be further transmitted towards the rear part of the engine. The inter-shaft bearing system may comprise more than one bearing. As will be described below, the inter-shaft bearing system can be positioned very close to the gearbox device.

The axial position of the inter-shaft bearing system can e.g. be chosen axially within or in front of a low pressure compressor or an intermediate compressor. The actual choice being dependent on the design case, involving e.g. the mechanical loads, the design space of the gearbox design and the design space within the frontal part of the engine.

In one further embodiment, the inter-shaft bearing system is axially located in front of a carrier bearing system. Alternatively the inter-shaft bearing system is axially located aft of the carrier bearing system by a distance of more than 20% of the inner radius of the carrier bearing system measured between the center planes of the bearing systems, but in particular less than 50% of the inner radius of the carrier bearing system.

As mentioned above, the inter-shaft bearing system can in one embodiment be axially adjacent to the gearbox device on the input side and/or the output side. The axial distance in the axial direction measured in either direction from the centreline of the gearbox device can e.g. be between 0.001 and 4 times the inner radius of the inter-shaft bearing system. This means that the e.g. part of the inter-shaft bearing system closest to the centreline of the gearbox device can be positioned on the input side or the output side of the gearbox device.

In one embodiment the inter-shaft bearing device comprises at least one ball bearing. It is e.g. possible to use a double ball bearing with two parallel rows. Furthermore, it is possible that the inter-shaft bearing device comprises bearings which are set apart a certain distant. Those bearings can be identical (e.g. all ball bearing) or they can have a different design.

Towards the front of the engine a fan shaft bearing system is radially located between a fan shaft as part of the output shaft device and a static front cone structure, in particular the fan shaft bearing system is being axially positioned within the width of the propulsive fan. The static front cone structure—as an example for general static structure within the gas turbine—is relative at rest to the output shaft device. The loads of the fan shaft bearing system can be transmitted to the static part. In one embodiment the fan shaft bearing system has an outer diameter between 0.05 to 0.35 the diameter of the propulsive fan, in particular between 0.1 and 0.3 times the diameter of the propulsive fan.

In a further embodiment a carrier bearing system is located in the gas turbine radially between the input shaft device and a static structure, in particular a static rear cone structure, carrier bearing system in particular comprising at least one roller bearing. Again, the carrier bearing system can comprise one more bearings of the same or different kinds. The loads taken by the carrier bearing system can transferred to the static rear cone structure. Alternatively a ball bearing could be used at location of the carrier bearing system and a roller bearing in the inter-shaft bearing system. In this configuration the axial load is transferred to the rear cone static structure and the inter-shaft bearing constrain only radially the carrier and sun shaft to control the gears radial relative displacements.

In one embodiment the carrier bearing system is axially adjacent to the gearbox device on the input or output side, in particular with an axial distance measured from the centreline of the gearbox device between 0.1 and 4 times the inner radius of the inter-shaft bearing system.

In a further embodiment, the planet carrier of the gearbox device comprises a seat element extending axially to the front and/or the rear of the gearbox device providing a radial seat for the inter-shaft bearing system and/or the carrier bearing system. The seat element can provide the outer radial seat for the inter-shaft bearing system and the radial inner seat for the carrier bearing system. The seat element can be connected to the planet carrier or in one piece with the planet carrier.

In on embodiment the inter-shaft bearing system and the carrier bearing system are essentially located in one vertical plane or they have an axial offset between 0.1 and 4 times the inner radius of the inter-shaft bearing system.

Further to the rear of the engine an input shaft bearing system is radially located between the input shaft device and a static rear structure, the input shaft bearing system in particular comprising at least one roller bearing. As in the bearing system described above, the input shaft bearing system can comprise more than one row of bearings, the rows being identical or different. The rows can be axially distanced. Alternatively a ball bearing could be used at location of the input shaft bearing system and a roller bearing in the inter-shaft bearing system.

The shape of the output shaft device can be adapted to spatial requirements. For providing sufficiently mechanical properties, embodiments of the output shaft device can comprise at least one axial cross-section with a conical, sigmoidal or logarithmical shape. In one alternative the fan shaft can be directly attached to the carrier.

In a further embodiment the output shaft device comprises a curvic or spline coupling. The coupling could e.g. the form of a bellow shaft to achieve a decoupling of the bending between the output shaft and the gearbox device.

In one embodiment of the gas turbine the load path for force and/or torque from the driving turbine to the propulsive fan exclusively extends via the input shaft device, the gearbox device and the output shaft device. A design like this in particular does not have a through shaft extending through the gearbox device towards the frontal part of the gas turbine. Not having a through shaft saves considerable weight, and therefore costs.

On the input side of the gearbox device an embodiment of the gas turbine comprises a sealing device which is radially located between the input shaft device and the static rear structure, in particular axially within or in front of a low pressure compressor or the intermediate compressor.

The gas turbine has a certain elasticity which is acceptable within bounds. This is e.g. relevant to the control of the tip clearance. One embodiment comprises restriction device restricting the tilt of a compressor, in particular the input shaft device having a defined stiffness so that the maximum radial deviation is in the range of 0.1 to 2 mm.

In one embodiment the ring gear is rigidly connected to the static front cone structure, as it is the case in epicyclic gearbox devices. It is also possible that e.g. the gearbox device comprises an epicyclic gearbox device with the ring gear being fixed relative to the other parts of the gearbox device and the output shaft device being connected to the planet carrier.

Alternatively, the gearbox device comprises a planetary gearbox device in star arrangement with the planet carrier fixed relative to the other parts of the gearbox device and the output shaft device being connected to the ring gear.

Since the lubrication especially of the gearbox device is an issue, in one further embodiment the planet carrier and/or the seat element of the planet carrier comprises at least one oil conduit for lubrication oil, in particular for the gearbox device.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine comprises a gearbox device that receives an input from the core shaft and outputs drive to the fan so as to drive the fan at a lower rotational speed than the core shaft. The input to the gearbox device may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox device may be arranged to be driven by the core shaft that is configured to rotate (for example in use) at the lowest rotational speed (for example the first core shaft in the example above). For example, the gearbox device may be arranged to be driven only by the core shaft that is configured to rotate (for example in use) at the lowest rotational speed (for example only be the first core shaft, and not the second core shaft, in the example above). Alternatively, the gearbox device may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

Each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

Each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18 or 18.5. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 N $kg^{-1}$ s, 105 N $kg^{-1}$ s, 100 N $kg^{-1}$ s, 95 N $kg^{-1}$ s, 90 N $kg^{-1}$ s, 85 N $kg^{-1}$ s or 80 N $kg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
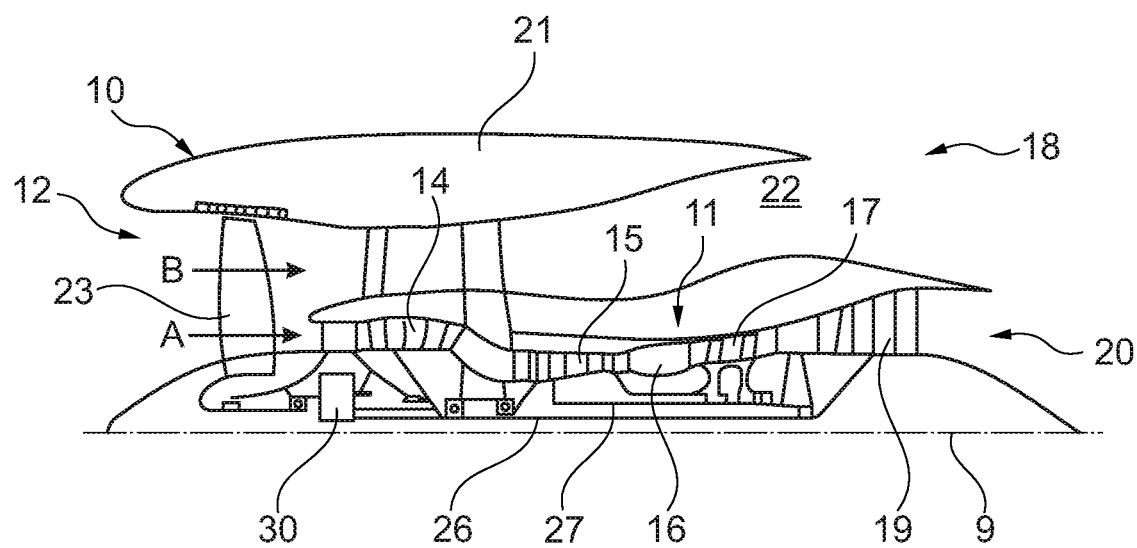
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox device 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox device 30 is a reduction gearbox.

Figure 2:
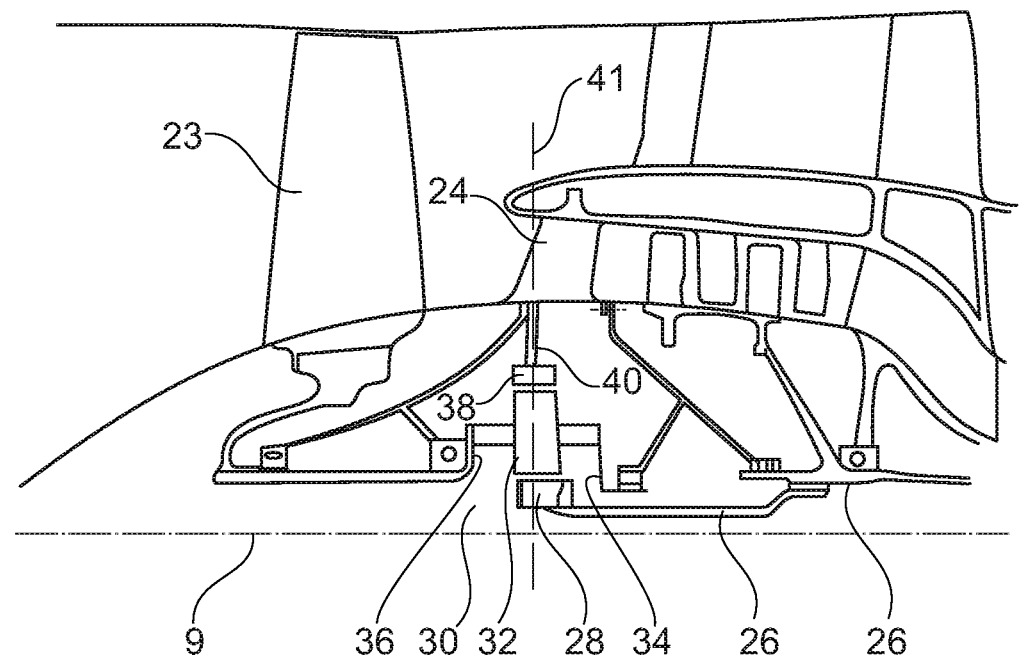
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
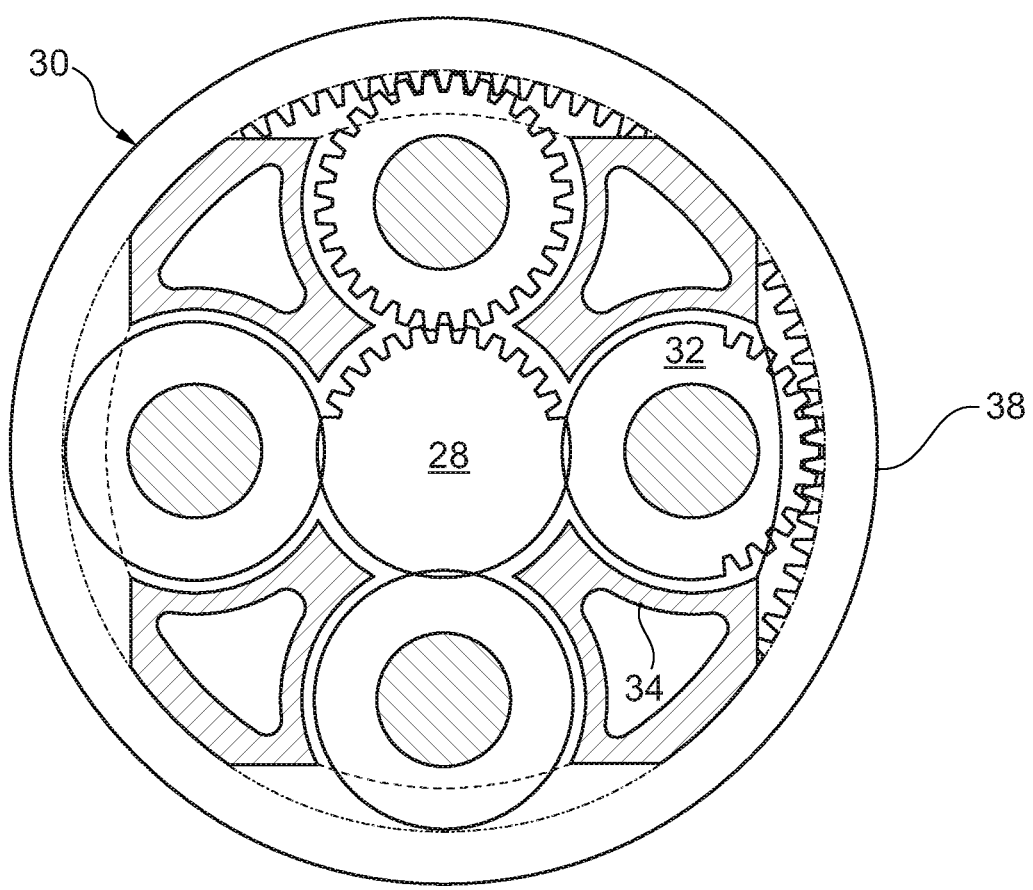
FIG. 3 is a partially cut-away view of a gearbox device for a gas turbine engine.

The epicyclic gearbox device 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox device 30 generally comprise at least three planet gears 32.

The epicyclic gearbox device 30 illustrated by way of example in FIGS. 2 and 3 is of the planetary type, in that the planet carrier 34 is coupled to an output shaft via linkages 36, with the ring gear 38 fixed. In another embodiment the carrier and the output shaft can be manufactured as one part. However, any other suitable type of epicyclic gearbox device 30 may be used. By way of further example, the epicyclic gearbox device 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox device 30 may be a differential gearbox device in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox device 30 in the engine 10 and/or for connecting the gearbox device 30 to the engine 10. By way of further example, the connections (such as the linkages 36, 40 in the FIG. 2 example) between the gearbox device 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox device 30 and the fixed structures, such as the gearbox casing) may be used, and the disclosure is not limited to the exemplary arrangement of FIG. 2. For example, where the gearbox device 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox device may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
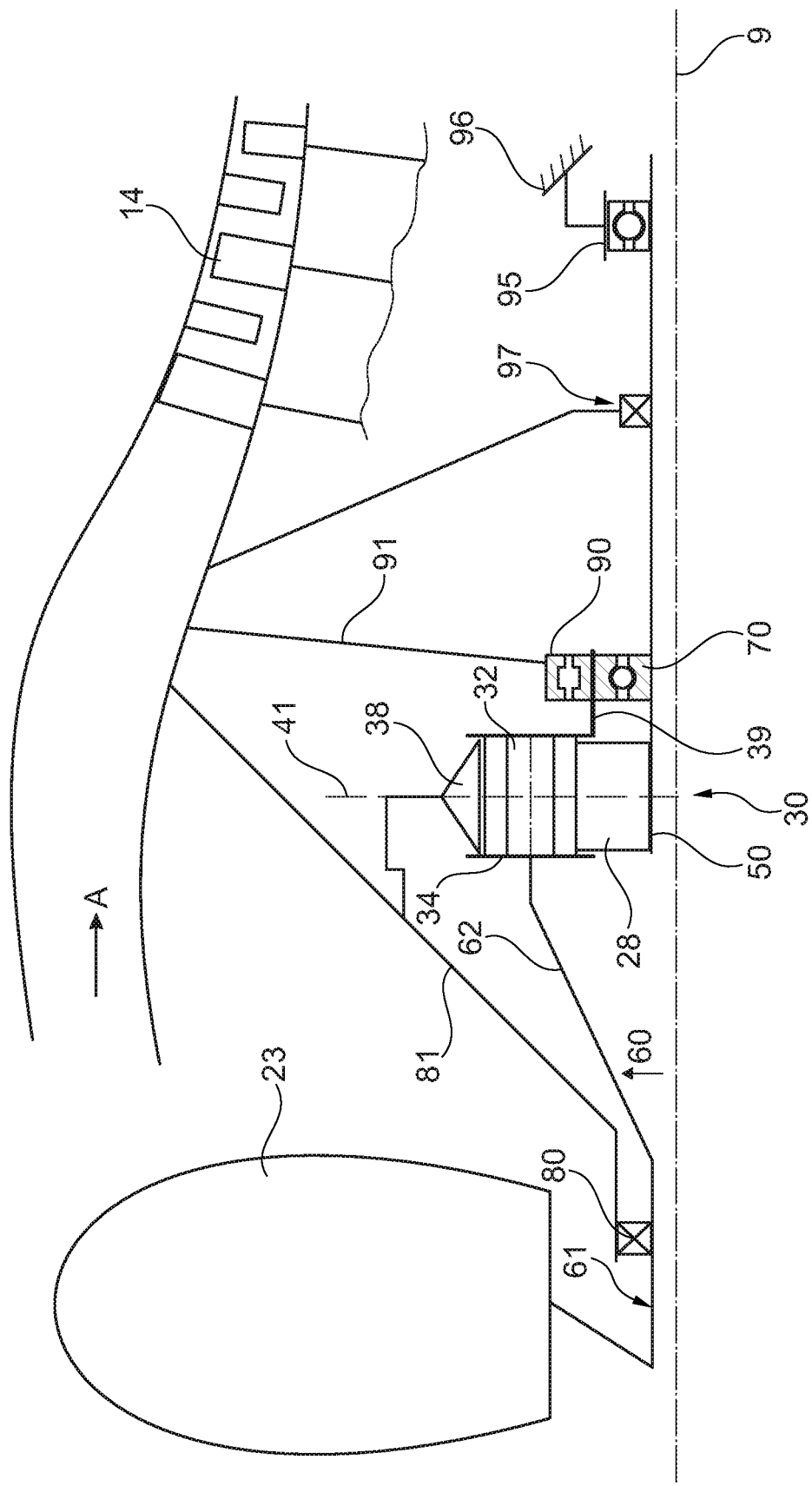
FIG. 4 shows schematically the upper half of a front section of an embodiment of a gas turbine with a drive train with an input shaft device of an epicyclic gearbox device, a gearbox device and an output shaft device extending to a propulsive fan.

In FIG. 4 a schematic view of the front section of geared turbofan engine 10 is shown. The view axially extends from the propulsive fan 23 in the front to the low-pressure compressor 14 towards the rear. The low-pressure compressor 14 is only shown symbolically to indicate the relative position of the drive train and its units.

The drive train comprises an input shaft device 50 (e.g. comprising the shaft 26 shown in FIG. 1), here driven by the not shown low-pressure turbine 19. The input shaft device 50 is connected to the sun gear 28 of the epicyclical gearbox device 30. The output of the gearbox device 30 takes place via the planet carrier 34 which is connected with an output shaft device 60 which has a portion acting as a fan shaft 61. That portion is rigidly connected with the propulsive fan 23. In an alternative embodiment, the output shaft 60 can be replaced by a direct connection of the fan disk 61 to the carrier 34.

Therefore, the input torque is transmitted from the input shaft device 50 to the sun gear 28 of the gearbox device 30, and to some extent to the ring gear mount. The planet carrier 34 transmits the output torque (at a reduced rotational speed) to the output gear device 60 and eventually to the propulsive fan 23.

The input shaft device 50 and the output shaft device 60 are here shown in a simplified manner. It is possible that the shape of the shaft devices 50, 60 can be more complex and comprises more than one piece.

The shafting arrangement of the embodiment shown in FIG. 4 also comprises several bearing systems e.g. for taking the mechanical loads or for locating the propulsive fan 23 and the gearbox device 30.

The first bearing to be described is an inter-shaft bearing system 70 being positioned radially between the input shaft device 50 and the planet carrier 34. This inter-shaft bearing system 70 here comprises one ball bearing. In alternative embodiments, more than one ball bearing (e.g. double bearings, two bearings of different design) or other bearing designs can be used. It is also possible that different bearings of the inter-shaft bearing system 70 are positioned at different locations.

The inter-shaft bearing system 70 is, in the embodiment shown in FIG. 4, located axially in front of the low-pressure compressor 14. In other embodiments (see FIG. 8), the inter-shaft bearing system 70 can be located axially within the low-pressure compressor 14 to support the compressor tip clearance and to ensure appropriate engine performance.

The inter-shaft bearing system 70 is, in this embodiment, axially adjacent to the gearbox device 30 on the input side. The axial distance between the inter-shaft bearing system 70 to the gearbox device 30 can e.g. be between 0.001 and 4 times the inner radius of the inter-shaft bearing system 70. This could be in the range of 1 to 100 mm measured from the axial front side of the inter-shaft bearing system 70 to a centreline 41 of the gearbox device 30.

The fan axial load is transferred via the fan-shaft bearing system 80 (roller bearing), via the gearbox device 30 and into the input-shaft bearing 95 towards the rear. With this arrangement the support structures of the bearings can be reduced.

The similar load path would apply when the inter-shaft bearing system 70 would comprise a roller bearing and the carrier bearing system 90 would comprise a ball bearing (i.e. inverse situation to the embodiment of FIG. 4). On the input side of the gearbox device 30 the load would be transferred radially outwards towards the ESS and the input shaft bearing system 95. The inter-shaft bearing system 70 would only be supported radially.

If both the inter-shaft bearing system 70 and the carrier bearing system 90 would comprise roller bearings, the fan axial load would be transferred via the static front cone section 81 and the ESS. In this case the gearbox device 30 would not carry an axial load.

It will be shown in FIGS. 11 to 14 that the inter-shaft bearing system 70 can have parts on the input and/or on the output side of the gearbox device 30.

Figure 5:
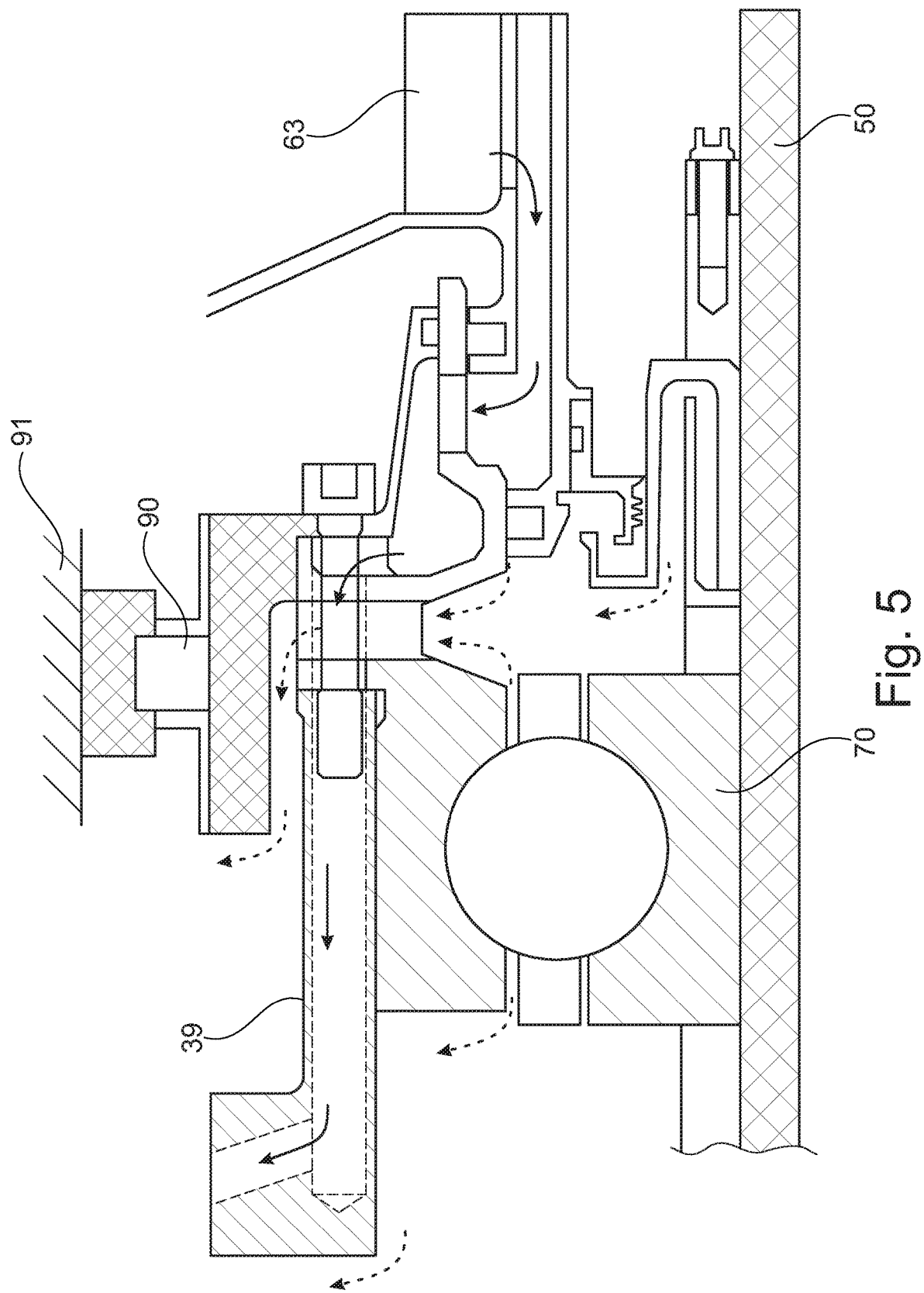
FIG. 5 shows a detail of an embodiment of an inter-shaft bearing system.

The inter-shaft bearing system 70 can also comprise an oil distribution capability as is shown in FIG. 5.

The radial inner seat of the inter-shaft bearing system 70 is on the input shaft device 50 (e.g. the sun shaft). The radial outer seat of the inter-shaft bearing system 70 is positioned at a part of the planet carrier 34. In the embodiment shown in FIG. 4 the planet carrier 34 comprises a seat element 39 extending axially to the rear of the gearbox device 30 providing a radial outer seat for the inter-shaft bearing system 70. As mentioned above, a similar seat element 34 might be provided on the planet carrier 34 on the output side of the gearbox device 30. Furthermore, it is not necessary, that the bearing of the inter-shaft bearing system 70 and the carrier bearing system 90 have to be vertically aligned.

This inter-shaft bearing system 70 locates the propulsive fan 23 and transmits axial loads towards a further bearing system towards the rear of the gearbox device 30, the input shaft bearing system 95. This bearing system is radially located between the input shaft device 50 and a static rear structure 96. In the embodiment shown here, the input shaft bearing system 95 comprises at least one ball bearing. In alternative embodiments, more than one roller bearing (e.g. double bearings, two bearings of different design) or other bearing designs can be used. In a further alternative, it would be possible to transfer the fan axial load via the bearing 90 and the rear cone structure. The inter-shaft bearing 70 would then transfer only radial load to control the gears relative displacements.

At the input side of the gearbox device 30 a further bearing system, the carrier bearing system 90 is located; the carrier bearing system 90 in this case could also be rear carrier bearing system 90.

The radial seat on the inner diameter is a structure coupled to the planet carrier 34 or the planet carrier 34 itself, such as the seat element 39 axially extending into the rear part of the engine 10. The radial seat of the carrier bearing system 90 is connected to a static cone structure 91.

Here, the carrier bearing system 90 is axially adjacent to the gearbox device 30 on the input side. The axial distance between the carrier bearing system 90 measured from the centreline 41 of the gearbox device 30, can be between 0.1 and 4 times the inner radius of the inter-shaft bearing system 70. That can be between 1 mm and 400 mm.

As shown in FIG. 4, the inter-shaft bearing system 70 and the carrier bearing system 90 are essentially located in the same vertical plane. Alternatively, it is possible that there is an axial offset between 0.1 and 4 times the inner radius of the inter-shaft bearing system 70.

In the embodiment shown in FIG. 4 a sealing device 97 prevents or minimizes the oil flow from the gearbox device 30 to other parts of the engine 10.

On the output side of the gearbox device 30, the output shaft device 60 only has one bearing system, a fan shaft bearing system 80. The radial inner seat of that bearing system is on the fan shaft 61, being a part of the output shaft device 60. The radial outer seat of the fan shaft bearing system 80 is connected to a static front cone structure 81. In the embodiment shown a roller bearing is used in the fan shaft bearing system 80. In alternative embodiments, more than one roller bearing (e.g. double bearings, two bearings of different design) or other bearing designs can be used. It would be possible to install a ball bearing and transfer the axial load to the fan 23 via the static front cone structure 81.

In the embodiment described herein the fan shaft bearing system 80 can have an outer diameter between 0.05 to 0.35 times the diameter of the propulsive fan 23. This range can be between 175 and 1250 mm.

In an alternative embodiment, the fan shaft bearing system 80 is not directly located underneath the propulsive fan 23. The fan shaft 61 then extends to the front from the fan shaft bearing system 80. The fan shaft 61 connects directly to the carrier 34.

The output shaft device 60 in the embodiment shown in FIG. 4 comprises essentially a cylindrical section adjacent to the output side of the gearbox device 30 and under the propulsive fan 23 (i.e. the fan shaft section 61). In between there is a conical section 62 linking the two cylindrical sections. Conical in this context means that the axial cross-section in this part of the output shaft device 60 is a straight line inclined radially inwards. In other embodiments this linking section can have different shapes than the conic shape in FIG. 4.

In the embodiment shown in FIG. 4 the static front cone structure 81 and the static structure 91 form together one cavity around the gearbox device 30. The already mentioned sealing device 97 secures the oil within that cavity. In an alternative design, the static structure 91 and the sealing device 97 are combined in one device.

The ring gear 38 is rigidly connected to the static front cone structure 81 but alternatively, it can be connected to a different static part within the engine 10.

The shafting arrangement described in connection with FIG. 4 allows a control of the dynamic modes of the power gearbox device 30, a control of relative deflections between the planet carrier 34 and the rotor of the low-pressure compressor 14 and deflections of the gearbox device 30 itself.

In the embodiment shown in FIG. 4 there is no shaft extending from the rear part of the engine 10 axially beyond the gearbox device 30 to the front. A through shaft, as it is known from the prior art is not present. The load path for force and/or torque from the driving turbine 19, i.e. the low-pressure turbine 19 to the propulsive fan 23 exclusively extends via the input shaft device 50, the gearbox device 30 and the output shaft device 60. The omission of the through shaft saves weight, costs and complexity. Furthermore, the number of bearings is reduced and overconstraining the low pressure rotor is avoided.

The input shaft device 50 can be so designed to be so stiff, that there is only a small tilt of a compressor 14, 15. The limitation of the tilting behaviour improves the tip clearance in the compressor 14, 15 and thereby improving the overall efficiency of the engine 10.

In FIGS. 9 to 14 different embodiments using different bearing arrangements are described.

In FIG. 5 details of the inter-shaft bearing system 70 and the carrier bearing 90 are shown in a schematic way. Basis for this embodiment is the embodiment shown in FIG. 4. But the general layout is also applicable to the other gas turbine embodiments.

The input shaft device (i.e. the sun shaft) 50 drives the sun gear 28 which is not shown here. The inter-shaft bearing system 70 is radially located between the inter-shaft bearing device 50 and the seat element 39 which is connected to the planet carrier (not shown here). The inter-shaft bearing system 70 comprises one ball bearing.

The carrier bearing system 90 is axially slightly offset against the inter-shaft bearing system 70 towards the rear. The radial inner seat of the carrier bearing system 90 is on the carrier seat element 39. The radial outer seat of carrier bearing system 90 is at the static structure 91.

FIG. 5 also shows the path of oil streams in the vicinity of the gearbox device 30. The dashed arrows represent scavenging oil flows from the lubrication of the inter-shaft bearing systems 70. The solid line arrows represent oil flows to the gearbox device 30. E.g. from a gearbox device oil feed 63 lubrication oil flows through conduit e.g. within the seat element 39 and then further into the planet carrier 34 (not shown here) towards the gearbox device 30.

Figure 6:
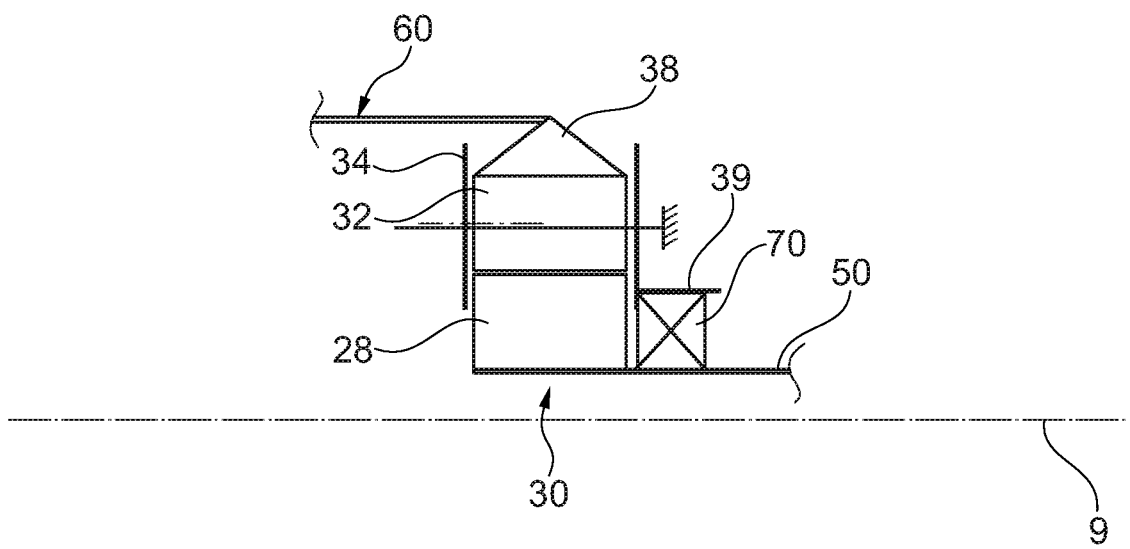
FIG. 6 shows schematically the upper half of a front section of a further embodiment of a gas turbine with a drive train with an input shaft device of a gearbox device, a gearbox device with a star formation and an output shaft device extending to a propulsive fan.

The embodiment shown in FIG. 6 is similar to the one in FIG. 4 so that reference can be made to the respective description. Only in this embodiment the gearbox device 30 does not comprise an epicyclic planetary gear device but a planetary gear device in star formation. This means that the planet carrier 34 is fixed relative to the other parts in the gearbox device 30. The torque output is effected through the ring gear 38. As in the embodiment shown in FIG. 4, the inter-shaft bearing system 70 is positioned radially between the input shaft device 50 and the planet carrier 34 of the gearbox device 30. For reasons of simplicity, the input shaft device 50 and the output shaft device 60 are only shown in part.

Figure 7:
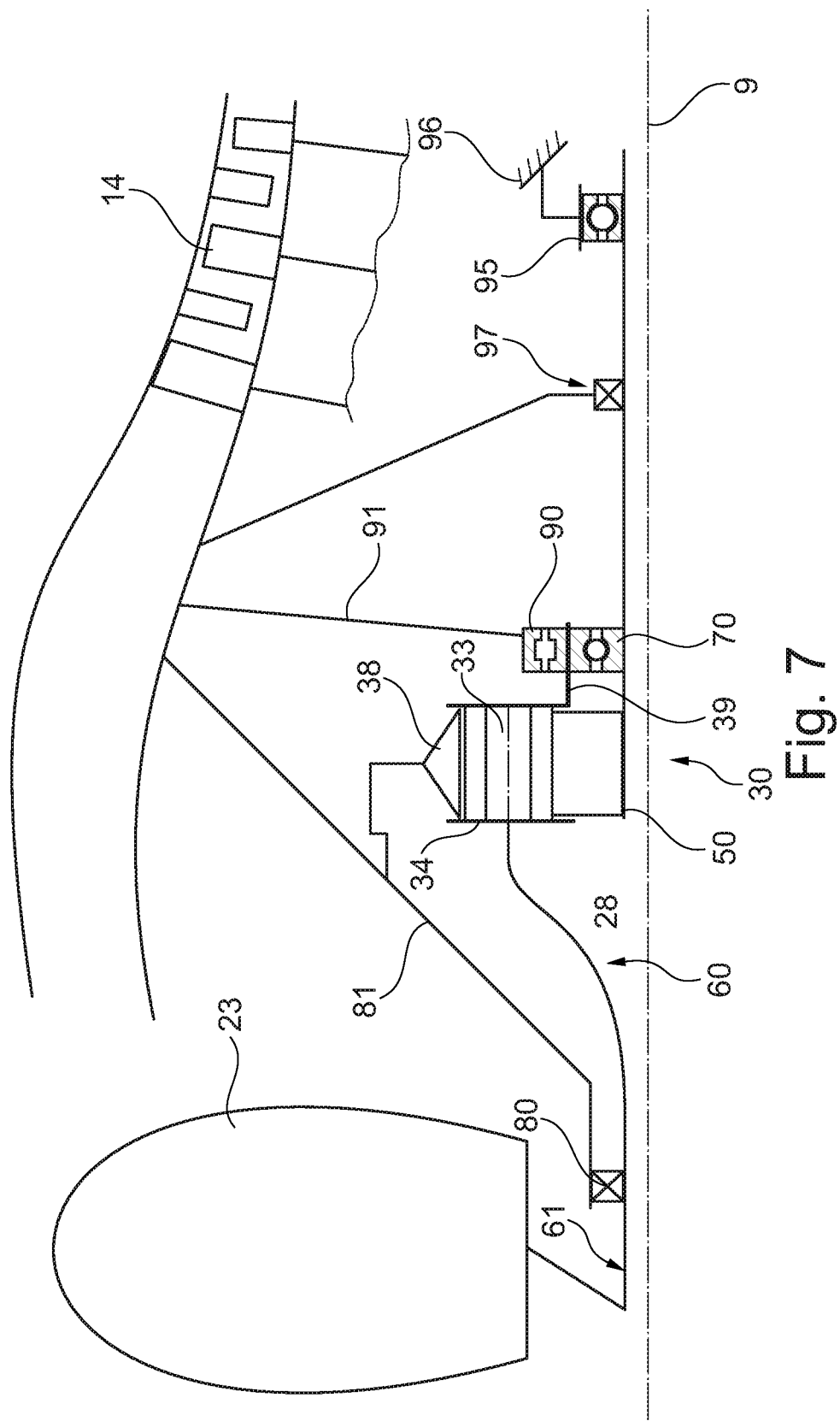
FIG. 7 shows schematically the upper half of a front section of an embodiment of a gas turbine with a drive train with an input shaft device of a gearbox device, a gearbox device and an output shaft device extending to a propulsive fan, the output shaft device having a sigmoidal axial cross-section.

In FIG. 7 a variation of the embodiment shown in FIG. 4 is shown so that reference can be made to the respective description. The difference to the embodiment shown in FIG. 4 is the shape of the output shape device 60. The embodiment shown in FIG. 7 has a sigmoidal cross-sectional shape.

Figure 8:
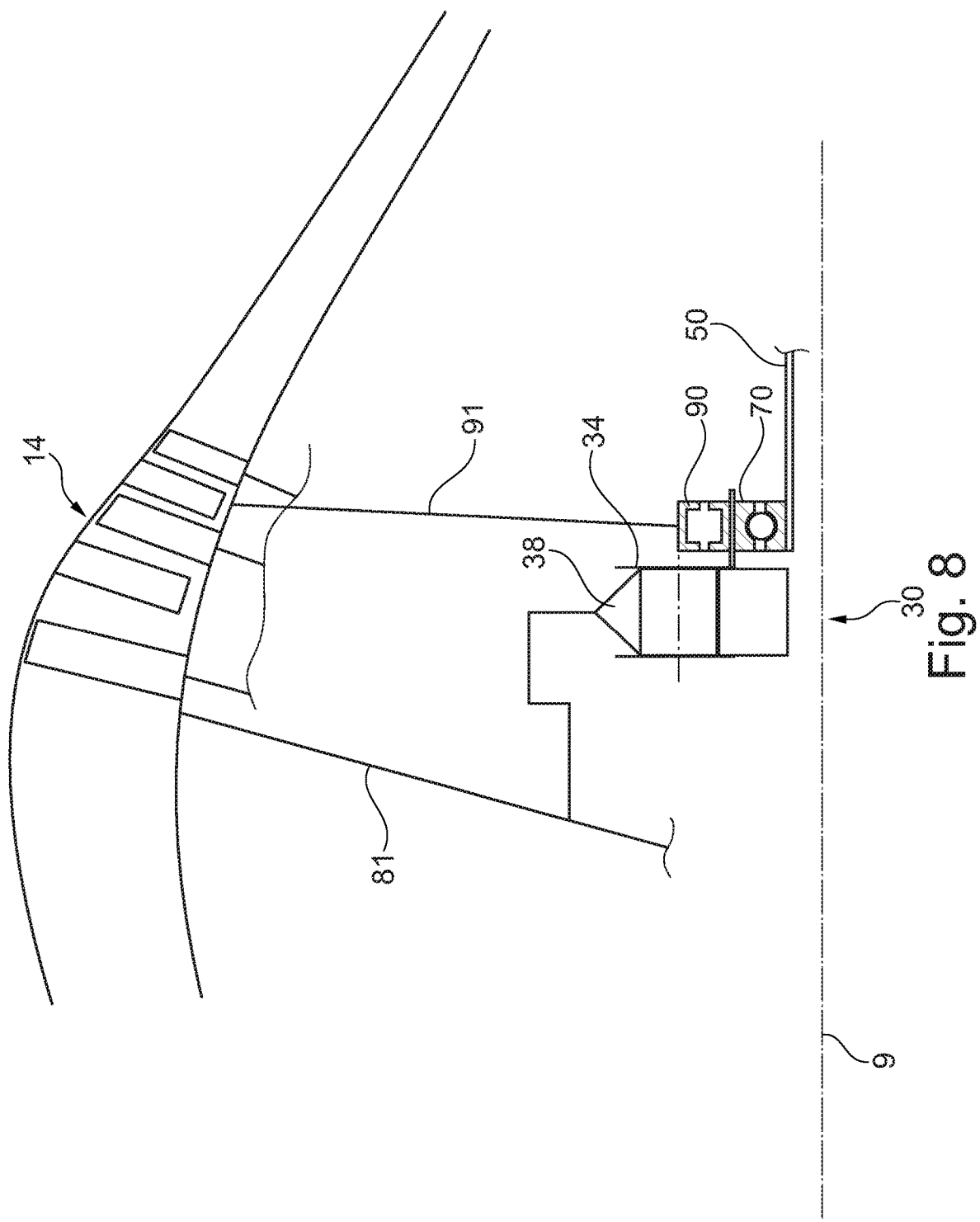
FIG. 8 shows schematically the upper half of a front section of an embodiment of a gas turbine with a drive train with an input shaft device of a gearbox device, a gearbox device and an output shaft device extending to a propulsive fan, the inter-shaft bearing being located within the intermediate compressor.

FIG. 8 schematically shows a further variation of the embodiment shown in FIG. 4 so that reference can be made to the respective description. In the embodiment of FIG. 8 an epicyclic gearbox device 30 is driven by the input shaft device 50. The inter-shaft bearing system 70 is radially positioned between the planet carrier 34 and the input-shaft device 50. Other than in the embodiment of FIG. 4, the gearbox device 30, the inter-shaft bearing system 70 and the carrier bearing system 90 are located axially within the low-pressure compressor 14. This shows that the gearbox device 30 and the associated bearing systems 70, 90 can be located axially in different locations within the engine 10 so that the design can be adapted to different engine designs.

In the FIGS. 9 to 14 variations to the embodiment shown in FIG. 4 are described. So reference to the respective disclosure can be made.

Figure 9:
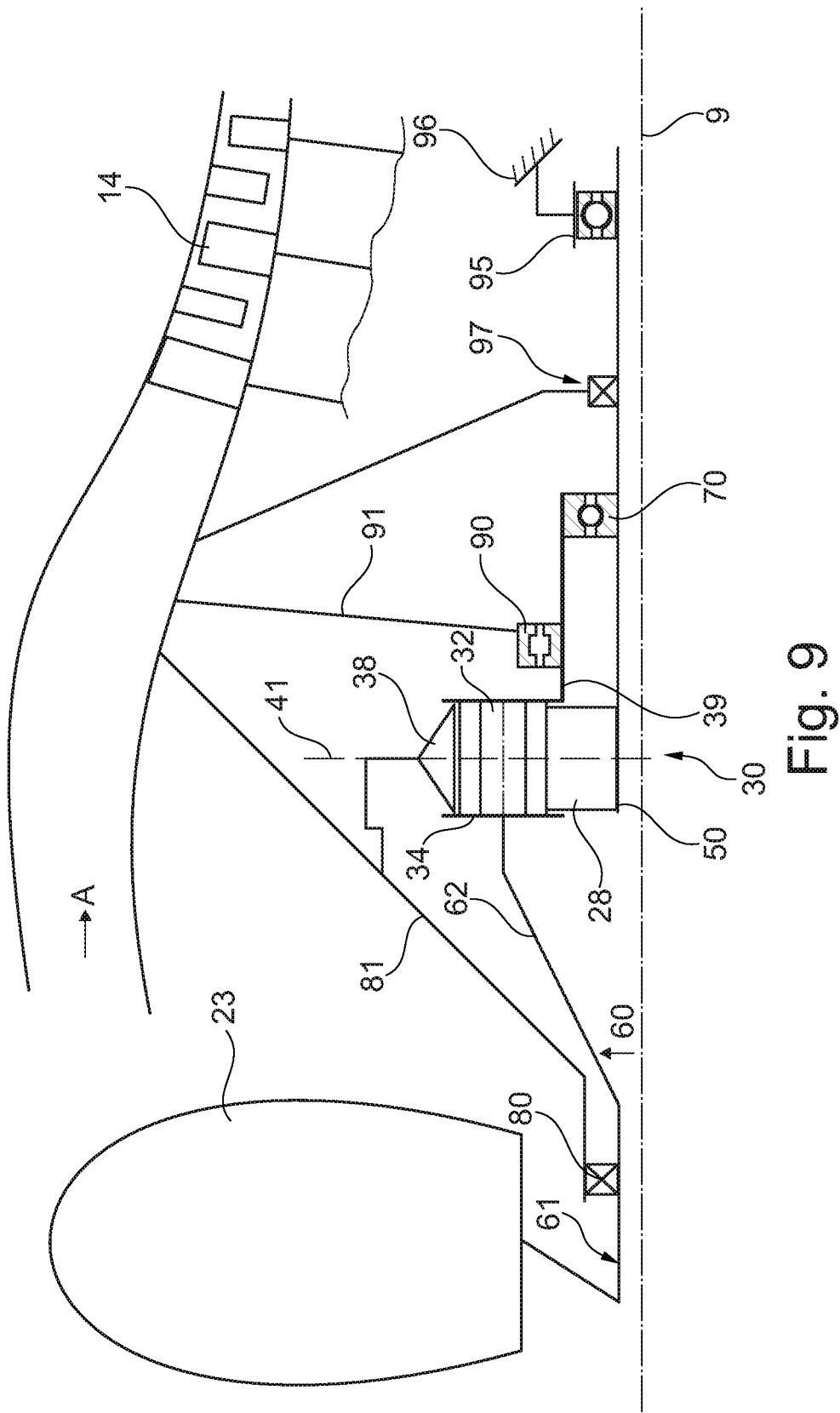
FIG. 9 shows schematically a variation of the embodiment shown in FIG. 4 with a different bearing arrangement.

In FIG. 9 the inter-shaft bearing system 70 has been moved towards the rear of the engine. The planetary carrier 34 with the seat element 39 has been extended toward the rear accordingly. This can be considered as an embodiment in which the inter-shaft bearing system 70 is axially located aft of the carrier bearing system 90. The distance can be e.g. more than 20% of the inner radius of the carrier bearing system 90 measured between the center planes of the bearing systems 70, 90, but in particular less than 50% of the inner radius of the carrier bearing system 90.

Figure 10:
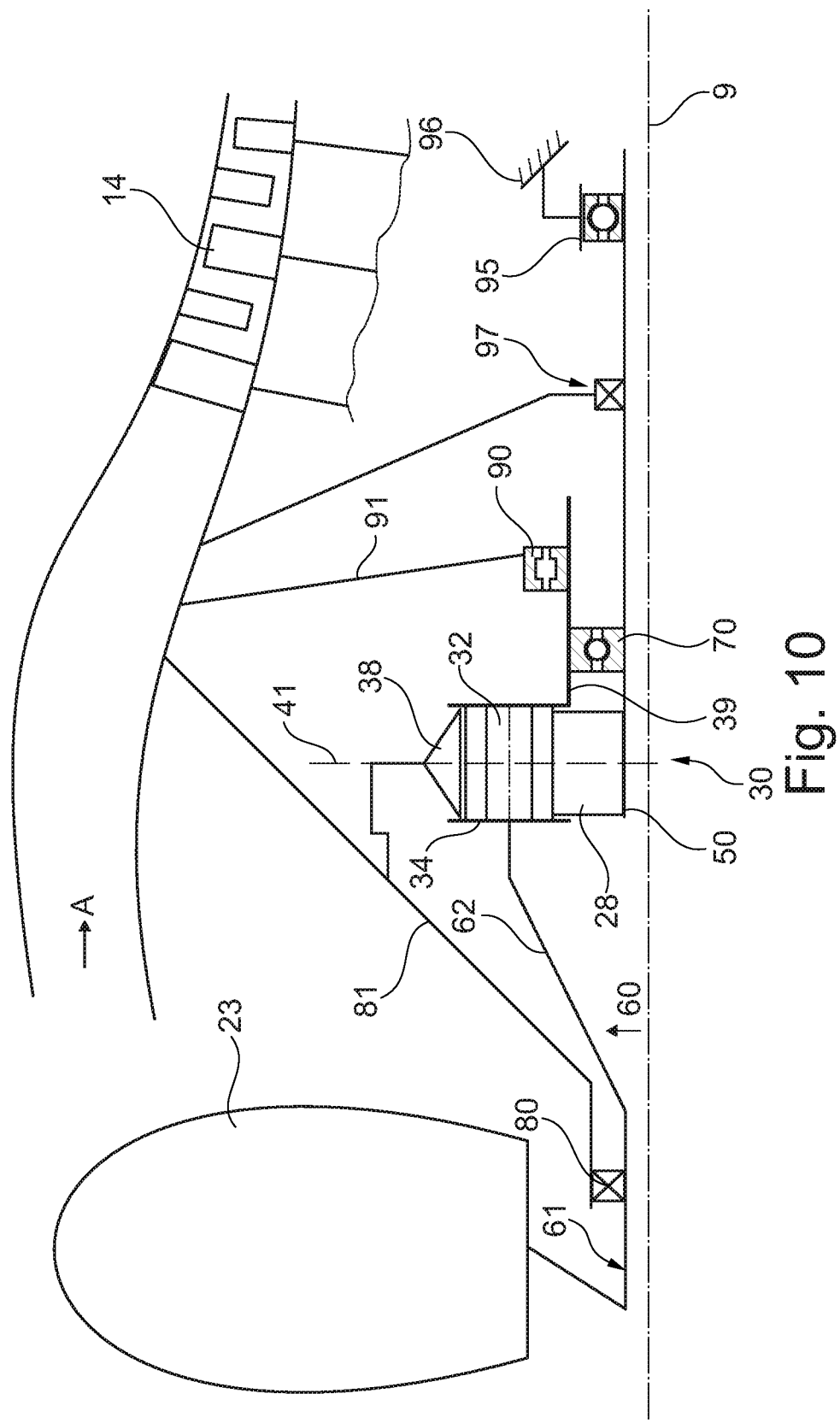
FIG. 10 shows schematically a variation of the embodiment shown in FIG. 4 with a different bearing arrangement.

In FIG. 10 the carrier bearing system 90 has been moved towards the rear of the engine. The planetary carrier 34 with the seat element 39 has also been extended toward the rear accordingly. This is an embodiment in which the inter-shaft bearing is located axially in front of the carrier bearing system 90.

The embodiments of FIGS. 9 and 10 show that carrier bearing system 90 and the inter-shaft bearing 70 do not necessarily have to be in one vertical plane.

In FIGS. 11 to 14 bearing arrangement are shown in which the carrier bearing system 90 and/or the inter-shaft bearing system 70 are located on the output side of the gearbox device 30.

Figure 11:
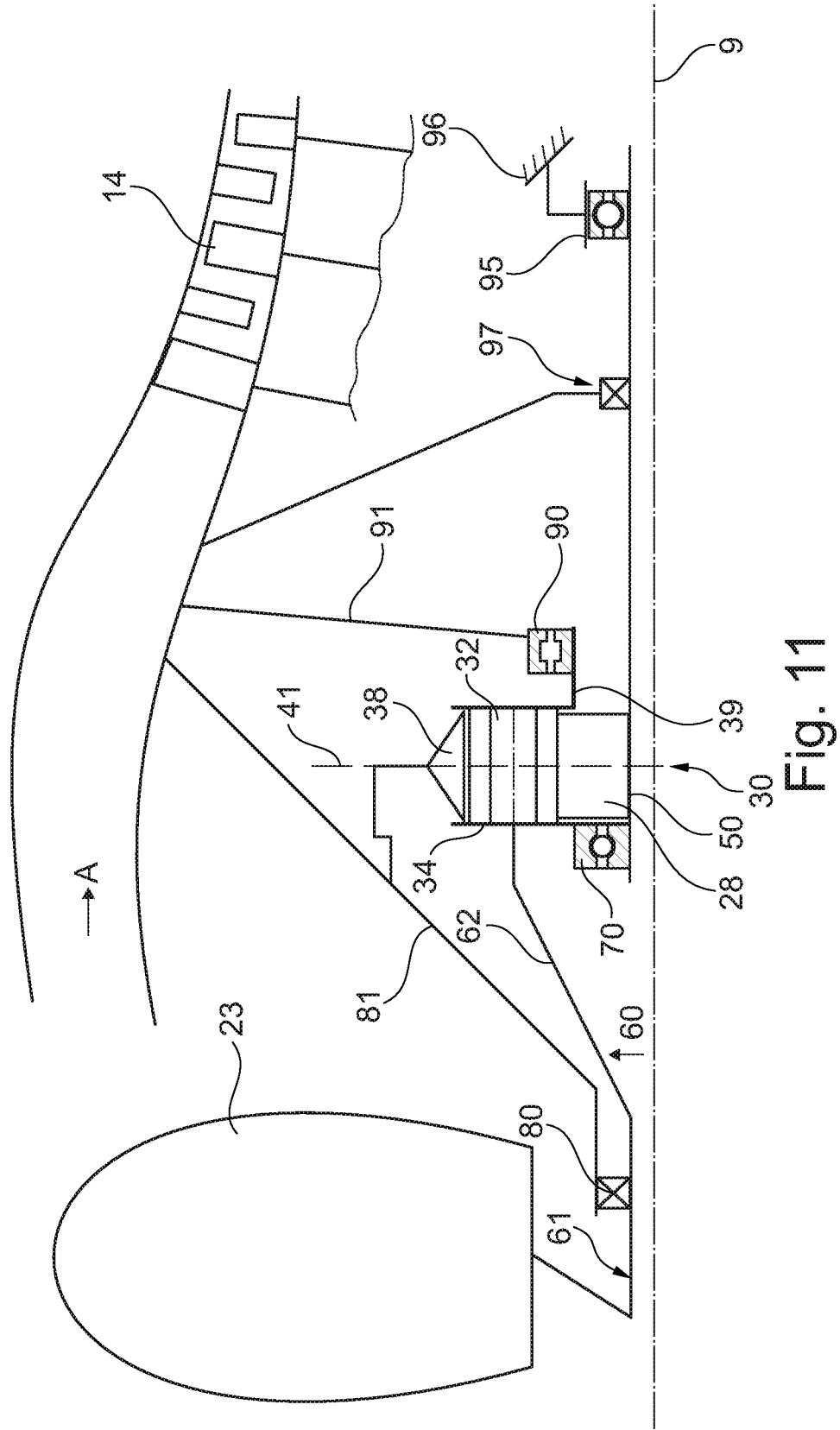
FIG. 11 show schematically a variation the embodiment shown in FIG. 4 with a different bearing arrangement.

In the embodiment of FIG. 11 the inter-shaft bearing system 70 is located at the output side of the gearbox device 30. The planet carrier 34 and the sun shaft are extended here to provide a bearing seat. The carrier bearing system 90 remains at the input side of the gearbox device 30.

Figure 12:
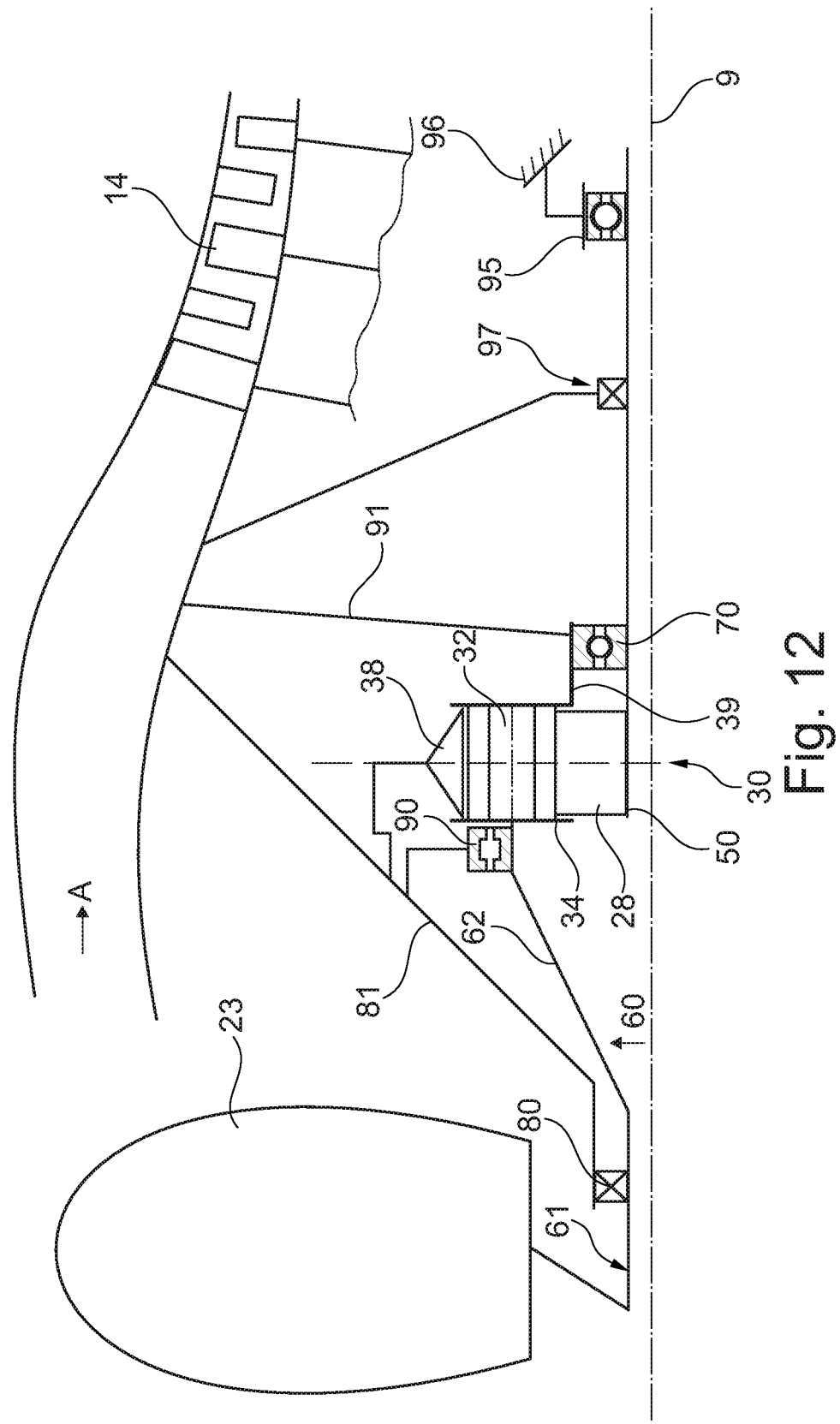
FIG. 12 show schematically a variation the embodiment shown in FIG. 4 with a different bearing arrangement.

The embodiment of FIG. 12 has an inter-shaft bearing system 70 at the input side of the gearbox device 30 and a carrier bearing system 90 at the output side of the gearbox device 30. The embodiment comprises a ball bearing in the inter-shaft bearing system 70 and a roller bearing in the carrier bearing system 90 on the output side.

If the carrier bearing system 90 comprises a ball bearing and the inter-shaft bearing system 70 comprises a roller bearing, the axial fan load path is transferred via the carrier bearing system 90 to the ESS. The gearbox device 30 would be free of an axial load.

Figure 13:
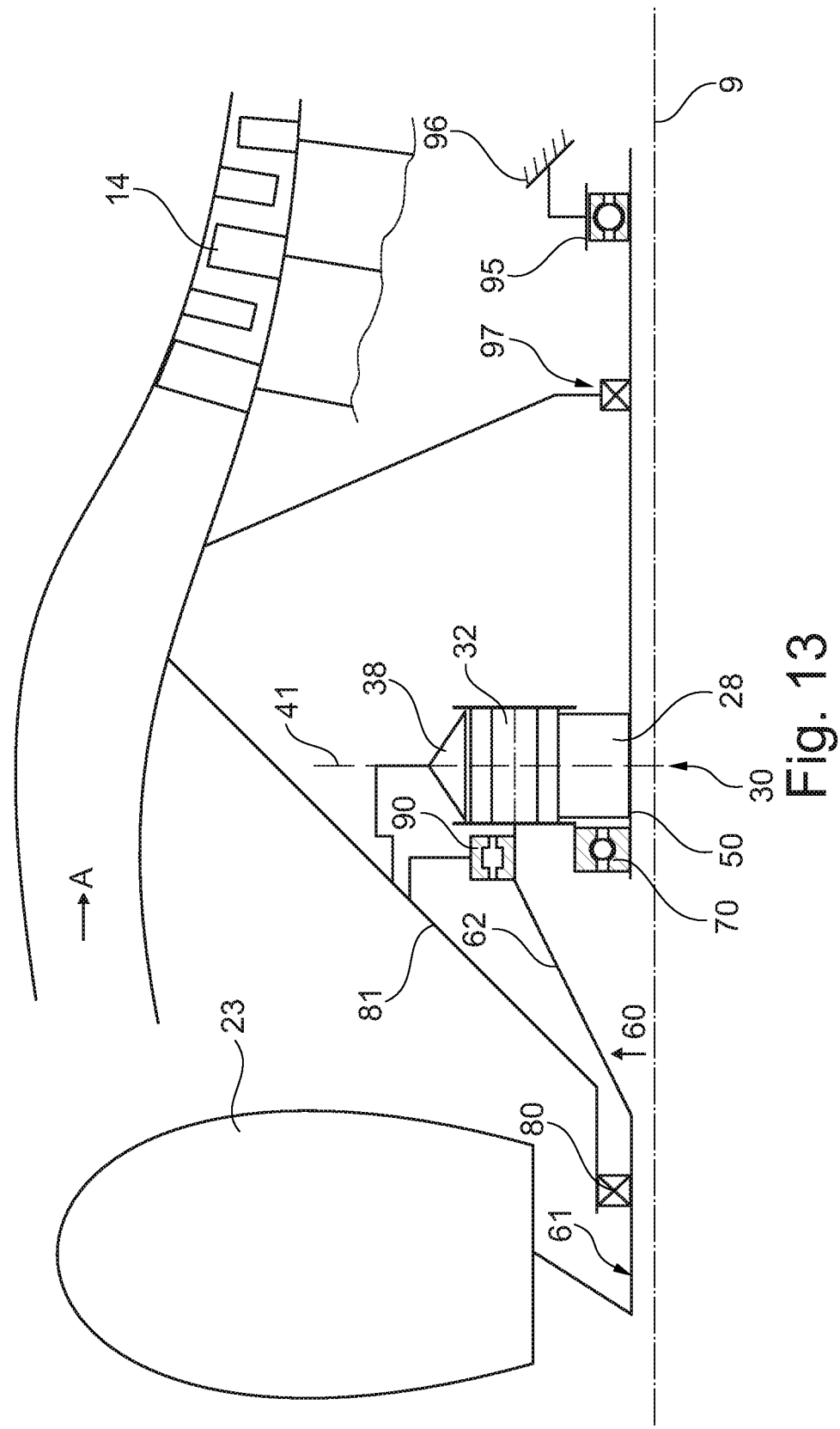
FIG. 13 show schematically a variation the embodiment shown in FIG. 4 with a different bearing arrangement.

In the embodiment of FIG. 13, both the inter-shaft bearing system 70 and the carrier bearing system 90 are positioned on the output side of the gearbox device 30.

Figure 14:
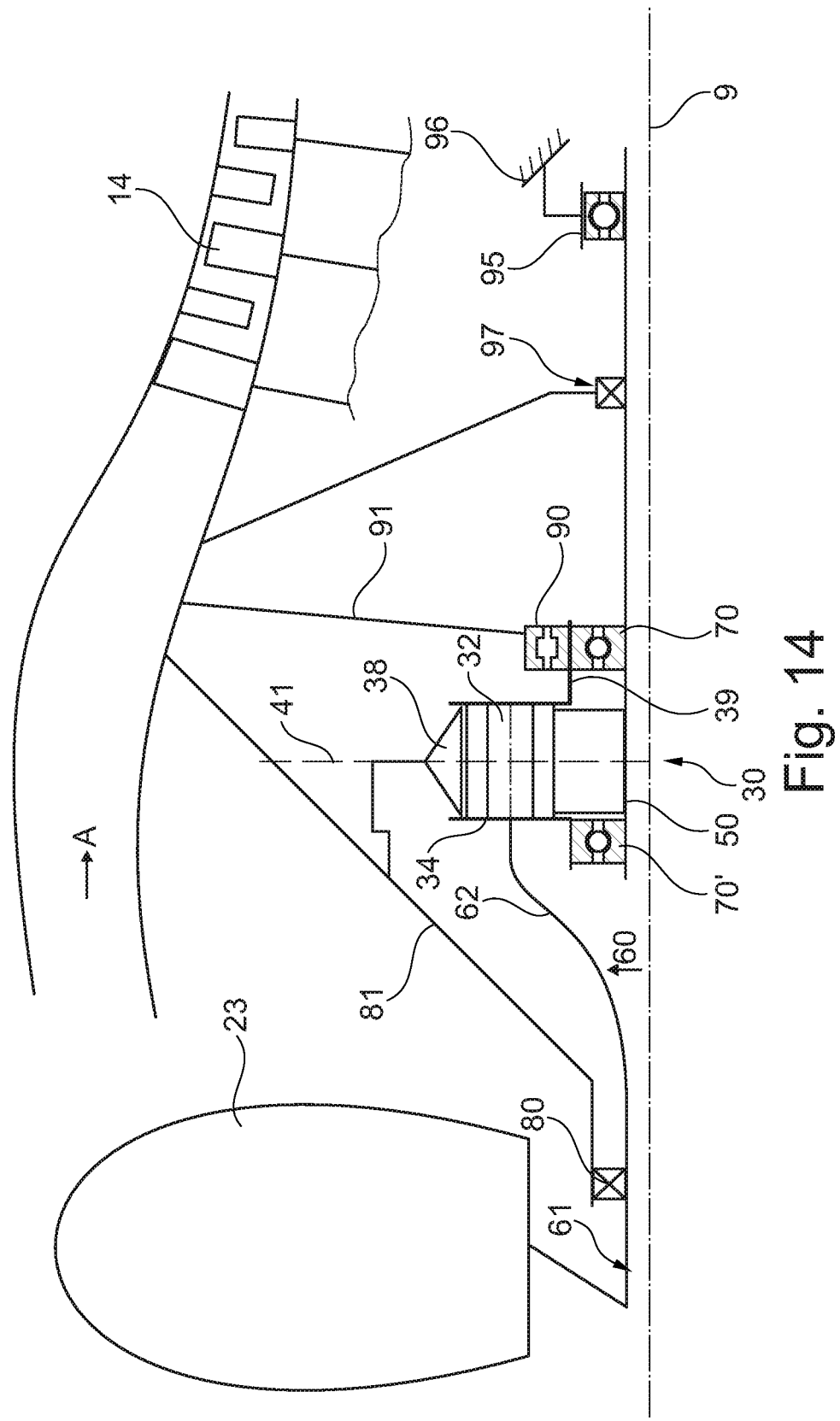
FIG. 14 show schematically a variation the embodiment shown in FIG. 4 with a different bearing arrangement.

In the embodiment of FIG. 14 the inter-shaft bearing system 70, 70' comprises two roller bearings, one on the input side of the gearbox device 30, one on the outside gearbox device 30.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE NUMBERS

A core airflow
B bypass airflow
9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure
26 shaft
27 interconnecting shaft
28 sun gear
30 gearbox (gearbox device)
32 planet gears
34 planet carrier
36 linkages
38 ring gear
39 seat element
40 linkages
41 centerline gearbox
50 input shaft device (sun shaft)
60 output shaft device
61 fan shaft
62 conical section
63 gearbox device oil feed
70 inter-shaft bearing system
70' second part of the inter-shaft bearing system
80 fan shaft bearing system
81 static front cone structure
90 carrier bearing system
91 static structure
95 input shaft bearing system
96 static rear structure
97 sealing device

The invention claimed is:

1. A gas turbine engine comprising:
a turbine having a rotational axis;
an input shaft;
a gearbox having an input side connected to the turbine via the input shaft, and wherein the gearbox further comprises:
a sun gear connected to the input shaft;
a planet carrier including a seat element;
a plurality of planet gears attached to the planet carrier; and
a ring gear;
an output shaft;
a propulsive fan, wherein one chosen from the planet carrier and the ring gear is connected to the propulsive fan via the output shaft;
a carrier bearing system positioned at the seat element of the planet carrier; and
an inter-shaft bearing system at the input side of the gearbox and located radially between the input shaft and the planet carrier of the gearbox with respect to the rotational axis of the turbine; wherein the inter-shaft bearing system is axially in front of the carrier bearing system with respect to a core airflow through the gas turbine engine.

2. The gas turbine engine of claim 1, further comprising one chosen from a low-pressure compressor and an intermediate compressor, wherein the inter-shaft bearing system is located at one chosen from axially within and axially in front of the one chosen from the low-pressure compressor and the intermediate compressor.

3. The gas turbine engine of claim 1, wherein the inter-shaft bearing system is axially adjacent to the gearbox at an axial distance measured from a centerline of the gearbox between 0.001 and 4 times an inner radius of the inter-shaft bearing system.

4. The gas turbine engine of claim 1, wherein the inter-shaft bearing system comprises a ball bearing.

5. The gas turbine engine of claim 1, further comprising a static structure, wherein the output shaft further comprises a fan shaft and a fan shaft bearing system, wherein the fan shaft bearing system is radially located between the fan shaft and the static structure.

6. The gas turbine engine of claim 5, wherein the fan shaft bearing system includes an outer diameter between 0.05 to 0.35 times a diameter of the propulsive fan.

7. The gas turbine engine of claim 1, further comprising a static structure wherein the carrier bearing system is located radially between the input shaft and the static structure.

8. The gas turbine engine of claim 7, wherein the gearbox further comprises an output side, and wherein the carrier bearing system is axially adjacent to the gearbox on at least one chosen from the input side and the output side.

9. The gas turbine engine of claim 1, wherein the in the seat element extends axially to at least one chosen from a front and a rear of the gearbox, and wherein the seat element includes a radial seat for at least one chosen from the inter-shaft bearing system and the carrier bearing system.

10. The gas turbine engine of claim 1, wherein the inter-shaft bearing system and the carrier bearing system are one chosen from located in one vertical plane and located with an axial offset between 0.1 to 4 times an inner radius of the inter-shaft bearing system.

11. The gas turbine engine of claim 1, further comprising an input shaft bearing system and a static structure, wherein the input shaft bearing system is radially located between the input shaft and the static structure.

12. The gas turbine engine of claim 1, wherein the output shaft comprises at least one axial cross-section with one chosen from a conical, a sigmoidal and a logarithmical shape.

13. The gas turbine engine of claim 1, wherein the output shaft comprises a curvic or a spline coupling.

14. The gas turbine engine of claim 1, wherein a load path for at least one chosen from a force and a torque from the turbine to the propulsive fan exclusively extends via the input shaft, the gearbox and the output shaft.

15. The gas turbine engine of claim 1, further comprising a sealing device and a static rear structure, wherein the sealing device is radially located between the input shaft and the static rear structure.

16. The gas turbine engine of claim 1, further comprising a compressor having a maximum radial deviation of between 0.1 to 2 mm.

17. The gas turbine engine of claim 1, further comprising a static front cone structure, wherein the ring gear is rigidly connected to the static front cone structure.

18. The gas turbine engine of claim 1, wherein the gearbox further comprises an epicyclic gearbox and wherein the ring gear is fixed relative to other components of the gearbox and wherein the output shaft is connected to the planet carrier.

19. The gas turbine engine of claim 1, wherein the gearbox further comprises a planetary gearbox in a star arrangement with the planet carrier fixed relative to other components of the gearbox and wherein the output shaft is connected to the ring gear.

20. The gas turbine engine of claim 1, wherein at least one chosen from the planet carrier and the seat element includes at least one oil conduit for lubrication oil.

21. The gas turbine engine of claim 1, further comprising a second one of the inter-shaft bearing system located at an output side of the gearbox.

22. A gas turbine engine comprising:
a turbine having a rotational axis;
an input shaft;
a gearbox having an input side connected to the turbine via the input shaft, and wherein the gearbox further comprises:
    a sun gear connected to the input shaft;
    a planet carrier including a seat element;
    a plurality of planet gears attached to the planet carrier; and
    a ring gear:
an output shaft;
a propulsive fan, wherein one chosen from the planet carrier and the ring gear is connected to the propulsive fan via the output shaft;
a carrier bearing system positioned at the seat element of the planet carrier; and
a first inter-shaft bearing system at the input side of the gearbox and located radially between the input shaft and the planet carrier of the gearbox with respect to the rotational axis of the turbine;
a second inter-shaft bearing system at an output side of the gearbox and located radially between the input shaft and the planet carrier of the gearbox with respect to the rotational axis of the turbine.

* * * * *